United States Patent Office 2,913,485
Patented Nov. 17, 1959

2,913,485
2,7-DIMETHYL-3,5-OCTADIYNE-2,7-DIOL BIS(p-CHLOROBENZOATE)

David A. Gordon, Midland, Mich., assignor to The Dow Chemical Company, Midland, Mich., a corporation of Delaware No Drawing. Application May 19, 1958
Serial No. 735,982

1 Claim. (Cl. 260—476)

This invention is directed to 2,7-dimethyl-3,5-octadiyne-2,7-diol bis(p-chlorobenzoate). The novel compound corresponds to the formula

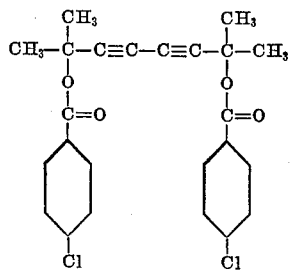

The novel diester is a crystalline solid, soluble in many common organic solvents, such as diethyl ether and perchloroethylene, and of very limited solubility in water. The present compound is useful as a parasiticide and as a selective herbicide.

The novel compound may be prepared by reacting 2,7-dimethyl-3,5-octadiyne-2,7-diol with p-chlorobenzoyl chloride. The reaction is carried out in the presence of a hydrogen chloride acceptor. Hydrogen chloride of reaction is formed and appears in the reaction mixture as the corresponding salt of the hydrogen chloride acceptor. Good results are obtained when employing two molecular proportions of p-chlorobenzoyl chloride and at least two molecular proportions of hydrogen chloride acceptor, which may be a tertiary amine, for each molecular proportion of the diol reactant. The reaction is exothermic. Reaction temperatures may be controlled by regulating the rate of contacting the reactants, or by external cooling. The reaction is carried out in the temperature range of 0°–80° C. and preferably from 10° to 50° C. An inert liquid reaction medium such as diethyl ether or benzene may be employed with the reactants, if desired.

In carrying out the reaction, the p-chlorobenzoyl chloride reactant is added slowly, portionwise, and with stirring to a mixture comprising the 2,7-dimethyl-3,5-octadiyne-2,7-diol and the hydrogen chloride acceptor together with inert liquid reaction medium, if desired. As the addition is carried out, the resulting reaction mixture is externally chilled to maintain a temperature in the desired range and with continued stirring. Upon completion of the reaction, the desired product may be separated in known ways. In one such procedure, the reaction mixture is extracted with diethyl ether, the extract dried, solvent removed by vaporization and the resulting product recrystallized from one or more solvents.

The following example illustrates the invention but is not to be construed as limiting.

Example 1 p-Chlorobenzoyl chloride (117 grams; ⅔ mole) was added dropwise and with stirring over a period of ½ hour to a mixture comprising 55 grams (⅓ mole) 2,7-dimethyl-3,5-octadiyne-2,7-diol and 100 milliliters pyridine. The resulting reaction mixture was chilled over an ice bath at temperatures between 0° and 30° C., whereby the entire mixture was rendered highly viscous. One hundred milliliters of diethyl ether was added and stirring was continued with the addition of further portions of pyridine, to carry the reaction to completion. Upon completion of the reaction, as evidenced by termination of tendency of the reaction mixture to heat spontaneously, the reaction mixture was washed with water, and the organic phase separated. This organic product phase was dried over anhydrous potassium carbonate. Solvent was then removed from the product phase by vaporization leaving a solid product residue which was successively recrystallized from methyl chloroform, perchloroethylene, and methyl cyclohexane to obtain a purified 2,7-dimethyl-3,5-octadiyne-2,7-diol bis(p-chlorobenzoate) product as a crystalline solid melting at 139° to 140.5° C.

The present compound is useful as a fungicide and is adapted to be employed in the protection of growing plants from fungus attack. For such use, the compound may be dispersed on an inert, finely divided solid and the resulting preparation employed as a dust. Also, such preparations may be dispersed in water with or without the aid of a wetting agent and the resulting aqueous suspensions employed as sprays. In other procedures, the compound may be employed in solvent such as an oil or as a constituent of solvent-in-water or water-in-solvent emulsions or as aqueous dispersions thereof which may be applied by spray, drench or wash. In a representative operation, the application as a thorough wetting spray of an aqueous composition containing the present compound as sole fungicidal agent at the rate of ½ pound per 100 gallons of ultimate composition to young tomato plants produced no evident plant injury but gave the said plants virtually complete protection against subsequent infestation by tomato early blight when a heavy inoculum of living spores of that organism was applied to the treated plants. In contrast, control plants identically treated except that the present compound was omitted from the applied spray became heavily infested with the fungus parasite.

I claim:

2,7 - dimethyl-3,5 - octadiyne - 2,7-diol bis(p-chlorobenzoate).

References Cited in the file of this patent
UNITED STATES PATENTS
2,648,702    De Garmo et al. _____ Aug. 11, 1953